(12) United States Patent
Tian et al.

(10) Patent No.: US 8,175,322 B2
(45) Date of Patent: May 8, 2012

(54) METHOD OF DIGITAL WATERMARK AND THE CORRESPONDING DEVICE, AND DIGITAL CAMERA WHICH CAN APPEND WATERMARK

(75) Inventors: Xin Tian, Beijing (CN); Man Liu, Beijing (CN); Xianghui Yang, Beijing (CN)

(73) Assignee: Huaqi Research Institute of Image Computing Co., Ltd., Beijing (CN)

( * ) Notice: Subject to any disclaimer, the term of this patent is extended or adjusted under 35 U.S.C. 154(b) by 1261 days.

(21) Appl. No.: 11/887,052

(22) PCT Filed: Feb. 6, 2006

(86) PCT No.: PCT/CN2006/000202
§ 371 (c)(1),
(2), (4) Date: Sep. 24, 2007

(87) PCT Pub. No.: WO2006/099788
PCT Pub. Date: Sep. 28, 2006

(65) Prior Publication Data
US 2009/0022358 A1    Jan. 22, 2009

(30) Foreign Application Priority Data
Mar. 23, 2005    (CN) .......................... 2005 1 0055680

(51) Int. Cl.
*G06K 9/00* (2006.01)
*H04N 1/40* (2006.01)
*B42D 15/00* (2006.01)
*G09C 3/00* (2006.01)
*H04L 9/32* (2006.01)

(52) U.S. Cl. ......... 382/100; 283/113; 358/3.28; 380/54; 713/176

(58) Field of Classification Search ........................ None
See application file for complete search history.

(56) References Cited

U.S. PATENT DOCUMENTS
6,005,936 A    12/1999    Shimizu et al.
(Continued)

FOREIGN PATENT DOCUMENTS
JP    2001-268339 A    9/2001
(Continued)

OTHER PUBLICATIONS
Moon et al.; Performance Evaluation of Watermarking Techniques for Secure Multimodal Biometric System, Computational Intelligence and Security: International Conference, CIS 2005, Xi'an, China, Dec. 15-19, 2005, p. 635-642.*

(Continued)

*Primary Examiner* — Brian Werner
*Assistant Examiner* — Nirav G Patel
(74) *Attorney, Agent, or Firm* — Buchanan Ingersoll & Rooney PC

(57) ABSTRACT

A digital camera comprising a watermark-adding device, which comprises a device for obtaining the signal values of digital signals, a bits dividing device, an altered regions initializing device, an eigenvalue calculating device, an encrypting device and a watermark embedding device. The bits dividing device divides the data recording each pixel point of the digital image, on the basis of bit, into bits for calculating the eigenvalue of the image, bits for hiding the watermark and bits for locating altered regions. The altered regions initializing device can set all the data of the bits for locating altered regions to 0 or 1. The eigenvalue calculating device can calculate the eigenvalue of digital signals. The encryption device encrypts the calculated eigenvalue. The watermark embedding device embeds the eigenvalue information in the digital signals.

17 Claims, 5 Drawing Sheets

U.S. PATENT DOCUMENTS

| | | | |
|---|---|---|---|
| 6,285,775 B1 | 9/2001 | Wu et al. | |
| 6,707,927 B1 * | 3/2004 | Kita et al. | 382/100 |
| 6,725,372 B1 | 4/2004 | Lewis et al. | |
| 2003/0210803 A1 | 11/2003 | Kaneda et al. | |
| 2004/0059936 A1 * | 3/2004 | Wakao et al. | 713/200 |
| 2006/0080743 A1 * | 4/2006 | Zhu et al. | 726/30 |

FOREIGN PATENT DOCUMENTS

WO    WO 01/80169 A1    10/2001

OTHER PUBLICATIONS

International Search Report.

\* cited by examiner

METHOD OF DIGITAL WATERMARK AND THE CORRESPONDING DEVICE, AND DIGITAL CAMERA WHICH CAN APPEND WATERMARK

FIELD OF THE INVENTION

The present invention relates to a method and a device for embedding watermarks in digital images, a method and a device for identifying digital images and a digital camera for embedding watermarks in the taken pictures. Particularly, the present invention relates to a method and a device for adding and identifying watermarks, which are capable of identifying the authenticity of digital images, and a digital camera comprising a watermark-adding device.

BACKGROUND OF THE INVENTION

By virtue of the gradually improved image quality and the more simplified PC interfaces, digital cameras have become very popular, which are able to shoot digitized images and thereby facilitate the transmission of images through the internet and the printing of images by a color printer. Nowadays, digital camera has almost become a necessity in our daily lives. As the digital techniques become more and more widespread, it is not difficult to utilize various kinds of software to modify/edit digital pictures, which makes the alteration of the information recorded in digital pictures convenient. But the authenticity and integrity of the digital pictures, such as pictures of insurances, contracts, bills, notes, etc., are especially important when those pictures are to be used as electronic evidences. Therefore, the matter of identifying the authenticity and integrity of digital pictures comes forth, which is solved in the present invention by a built-in picture authenticity-protection device.

Digital watermarking techniques can effectively prevent digital images from falsification, which can be divided into two different types on the basis of the object. The first type is robust watermarks, which are used to protect copyrights and provide legal basis when copyright disputes happen. The second type is fragile watermarks (or half fragile watermarks), which are used to detect if multimedia products have been maliciously altered or damaged. With regard to robust watermarks, they must be robust enough so that when multimedia products are attacked and altered, they can still be extracted correctly to prove the copyright of the author, whereas fragile watermarks are mainly used to prove the authenticity of multimedia products. At Present, multimedia pictures cannot be used as evidences before courts, simply because multimedia pictures can be easily modified by various kinds of software (e.g. Photoshop) without being detected and even a tiny change of medical images may result in wrong judgments of the states of illnesses by doctors. Thus, the identification of the authenticity of multimedia products is much more important than the identification of copyright at these occasions.

Please refer to the literatures listed below for the related prior arts about digital watermarks and digital cameras.

[1] G L. Friedinan "The trustworthy digital camera restoring credibility to the photographic image" IEEE Trans, Consumer Electron, Vol. 39, PP. 905-910, November 1993

[2] S. Walton, Information authentication for a slippery new age [J], Dr. Dobbs Journal, 1995, 20(4): 18-26

[3] CN1184294A "System for embedding authentication information into an image and an image alteration detecting system", application number: 97121196.9, application date: Oct. 27, 1997

[4] Wong P W. A public key watermark for image verification and authentication [A]. In: Proc of the IEEE International Conference on Image Processing (ICIP'98) [C], Chicago, Ill., USA, 1998, 1:455459

In Literature [1], Friedman puts forward a method based on digital signatures to identify the authenticity of pictures taken by digital cameras. This method utilizes public key system and generates digital signatures of images according to the secret key of the camera. The digital signatures are saved in other files and are distributed together with images. In this way, users may identify the authenticity of the image via the combination of public key, the image file and the digital signature file. But it requires more storage space and it is inconvenient to manage the digital signature information. Besides, the method cannot detect distortions.

Literature [2] provides a method to calculate the eigenvalue of the image using checksum. In this way the authenticity of the image is not so guaranteed when compared with hash algorithm because by using checksum, a same value might be obtained from different images.

The Chinese patent CN1184294A [3] divides a image into two regions and the hash value is calculated from one region of the image, then the hash value obtained is embedded in the other region of the image by method of pixel-block encoding and finally, the two regions are combined together by a region-combination unit. A big defect of this method is that the region in which the image has been altered cannot be located.

Literature [4] provides a public key watermark method for image authentication. The watermark algorithm of the digital image in this method utilizes image blocks to locate the altered region. But the speed of taking pictures will be slowed down if this method of processing images by blocks is used in digital cameras. Therefore, the practical applicability of using this method in digital cameras is not ideal.

Also, there has been a great variety of sophisticated algorithms for calculating the eigenvalue of images in the prior art. For instance, the SHA-1 algorithm, the description and the C language source code of it can be found in a most authoritative document "rfcs 3174" on the internet (http://www.fags.org/rfcs/rfc3174.html).

SUMMARY OF THE INVENTION

The object of the present invention is to provide a method and a device for embedding and identifying watermarks in digital images and a digital camera for embedding watermarks in pictures, so that the authenticity and integrity of the pictures taken by the digital camera can be identified. When pictures are edited, modified, added or deleted, the changes that have been made can be informed of by the method of identifying the authenticity and integrity of the pictures so as to achieve the protection of the authenticity of digital pictures and to enable the use of digital pictures as electronic evidences.

In order to achieve the aforementioned object, the content of the present invention is described as follows.

The present invention provides a method for adding watermarks in digital images, which comprises the following steps:
  the value of the data representing each pixel of the digital image is obtained;
  the data recording each pixel point of the digital image are divided, on the basis of bit, into bits for calculating the eigenvalue of the image, bits for hiding the watermark and the bits for locating altered regions;
  the eigenvalue of the image is calculated from the bits for calculating the eigenvalue of the image;

all the bits for locating altered regions are set to 0 (or 1) when initialization;

the calculated eigenvalue is encrypted; and the encrypted eigenvalue is hided in the digital image using fragile digital watermarking techniques.

The present invention also provides a method for identifying the authenticity and integrity of digital images, which comprises the following steps:

the data recording each pixel point of the digital image are divided, on the basis of bit, into bits for calculating the eigenvalue of the image, bits for hiding the watermark and the bits for locating altered regions;

the eigenvalue of the image is calculated from the bits for calculating the eigenvalue of the image;

the hidden watermark information is extracted from the bits for hiding the watermark;

the extracted information is decrypted;

the altered regions are located; and the calculated eigenvalue and the decrypted information are compared to see whether they are equal or not. If they are equal and no altered region is located, the image is authentic and hasn't been altered. Otherwise the authenticity of the image cannot be guaranteed and the altered regions can be pointed out at the same time.

The present invention also provides a device for adding watermark in digital images, which comprises:

a unit for obtaining the value of the data representing each pixel of the digital image;

a unit for dividing the data that record each pixel point of the digital image on the basis of bit into bits for calculating the eigenvalue of the image, bits for hiding the watermark and the bits for locating altered regions;

a unit that calculates the eigenvalue of the image from the bits for calculating the eigenvalue of the image;

a unit that sets all the bits for locating altered regions to 0 (or 1), i.e. initializes the locating of altered regions;

a unit for encrypting the calculated eigenvalue; and a unit that hides encrypted eigenvalue in the digital image using fragile digital watermarking techniques.

The present invention also provides a device for identifying the authenticity and integrity of digital images, which comprises:

a unit for marking the data that record each pixel point of the digital image on the basis of bit as bits for calculating the eigenvalue of the image, bits for hiding the watermark and the bits for locating altered regions;

a unit that calculates the eigenvalue of the image from the bits for calculating the eigenvalue of the image;

a unit that extracts the hidden watermark information from the bits for hiding the watermark;

a unit that decrypts the extracted information;

a unit that locates the altered regions; and a unit that compares the calculated eigenvalue with the decrypted information to see whether they are equal or not. If they are equal and no altered region is located, the image is authentic and hasn't been altered. Otherwise the authenticity of the image cannot be guaranteed and the altered regions can be pointed out at the same time.

The present invention also provides a digital camera comprising a watermark-adding device. The digital camera firstly converts the analog signals received into digital signals and divides the data recording each pixel point of the digital image on the basis of bit into bits for calculating the eigenvalue of the image, bits for hiding the watermark and the bits for locating altered regions. Then, an algorithm for calculating eigenvalue, such as SHA-1, MD 5, CRC 16, CRC 32 or CRC-CCITT, is used to calculate the unique eigenvalue of the bits for calculating the eigenvalue of the image of the digital signals and the calculated eigenvalue is encrypted using secret key. Finally, encrypted eigenvalue is embedded in the bits for hiding the watermark of the digital signals by fragile watermarking techniques and the bits for locating altered regions are all set to 0 (or 1) before the formation of lossless type digital images.

When identifying the authenticity and integrity of the digital pictures, digital signals are firstly reverted from digital pictures and the data recording each pixel point of the digital image are divided on the basis of bit into bits for calculating the eigenvalue of the image, bits for hiding the watermark and bits for locating altered regions. Then relevant algorithm for calculating eigenvalue is used to calculate the unique eigenvalue of the bits, which are used for calculating the eigenvalue of the image, in the pixel points of digital signals and then the watermark information that is hided in the bits for hiding the watermark in digital signals is extracted according to fragile watermarking algorithm. After that, the watermark information extracted is decrypted using public key and bits for locating the altered regions is examined and if some of the bits are changed into 1 (or 0), the relevant regions are deemed altered. In the end, the hash value and the decrypted watermark information are compared and if they are equal and no altered region is located, the picture is deemed authentic. Otherwise the picture is deemed altered. In the latter case, the altered regions can be located according to those bits for locating the altered regions that have been changed into 1. Thereby, the authentication of the picture is accomplished.

The present invention provides a system for adding watermarks in a digital camera comprising a watermark-adding device and a method of identifying relevant pictures. The system comprises:

a device for obtaining signal value of the digital signals;

a device that divides bits;

a device that initializes the altered regions;

a device for calculating eigenvalues; and an encrypting device and a watermark embedding device;

The method for identifying the pictures comprises the following steps:

digital signals are read;

relevant bits are identified;

the eigenvalue of the digital signals is obtained by relevant algorithm for calculating eigenvalue;

hidden watermark information is extracted from digital signals using relevant fragile digital watermarking techniques;

the extracted watermark information is decrypted;

altered regions are located; and the calculated eigenvalue and the decrypted watermark information are compared and if they are equal and no altered region is located, the picture is deemed not altered. Otherwise, the authenticity and integrity of the picture are not guaranteed. In the latter case, relevant methods can be used to locate the altered regions of the picture. The system and the method are described below with more details.

The System in a digital camera for adding watermarks comprises:

a device for obtaining the signal value of the digital signals, which is designed to read the value of the digital signals that is obtained by converting the analog signals responding to the optical image;

a bits dividing device, which is designed to divide the data recording each pixel point of the digital image into bits for calculating eigenvalue of the image, bits for hiding the watermark and the bits for locating altered regions;

a device that initializes the locating of altered regions, which is designed to set all the bits for locating altered regions to 0 or 1;

a device for calculating eigenvalue, which is designed to calculate the unique eigenvalue of input digital signals using the bits for calculating the eigenvalue of the digital image;

an encrypting device, which encrypts the calculated eigenvalue using secret key; and a watermark embedding device, which embeds the encrypted eigenvalue in the bits for hiding the watermark by fragile digital watermarking techniques.

The picture identifying method can be regarded as comprising a set of reversed steps on which the watermark adding device operates, which comprises the following steps:

digital signals are reverted from lossless format picture and are then read;

the data recording each pixel point of the digital image are marked on the basis of bit as bits for calculating the eigenvalue of the image, bits for hiding the watermark and bits for locating the altered regions;

relevant algorithm for calculating eigenvalue is used to obtain the unique eigenvalue of the digital signals from the bits for calculating the eigenvalue of the image;

relevant fragile watermarking techniques are used to extract hidden watermark information from the bits for hiding the watermark;

the extracted watermark information is decrypted by public key;

the altered regions of the picture are located, i.e. to locate the position where the values of the corresponding bits for locating the altered regions have been changed into 1 (or 0); and the hash value and the decrypted watermark information obtained are compared and if they are equal and no altered region is located, the picture is deemed authentic without alteration. Otherwise the picture is deemed altered. In the latter case, the altered regions can be pointed out.

It must be noted that only the data containing in the bits for calculating the eigenvalue of the image are used during the calculation of the eigenvalue, which is to ensure that the calculated eigenvalue matches the embedded eigenvalue. If the data in the bits for hiding the watermark and the bits for locating the altered regions are all filled with colored signals such as black or white signals, the data can be wholly inputted into the algorithm that calculates the eigenvalue. In this way, the correct identifying results can be guaranteed even if after the embedding of data.

In addition, the digital camera of the present invention is able to hide other information in the taken pictures, such as the ID of the camera, the date of taking pictures and the position information provided by GPS. It must also be noted that after obtaining the digital signals of the digital camera, the information should be firstly embedded in the digital signals for calculating the eigenvalue before the calculation can be proceeded, or the identifying result of the picture will be affected.

Furthermore, in order to prevent illegal accesses of the information stored in the digital camera, methods such as tamper-proofing modules used in cellphones can be utilized, which prevents the damages illegally caused by third parties. If this kind Of illegal accesses have taken place, the secret key is deemed pilfered and the authenticity and integrity of the image data and pictures encrypted by the secret key are not guaranteed.

An authentication center can be founded on the internet so that when identifying the pictures, where anybody can identify the authenticity and integrity of the pictures and notarize the identifying results.

Moreover, the present invention is not limited to digital cameras but can be applied to other digital systems such as digital video system.

The advantages of the present invention are listed as follows:

1. By virtue of the appropriate algorithm for calculating the eigenvalue utilized, the calculated eigenvalue is unique.

The digital signals obtained are inputted into the algorithm for calculating the eigenvalue, then the unique eigenvalue is obtained and finally, digital images are saved losslessly when forming the images. All of these guarantee the correct detection of the image even if only one pixel is changed and therefore provides good assurance of the correctness of the identification of the authenticity and integrity of the pictures.

2. Because the system of the present invention is built in the digital camera, it is very convenient to use and the watermark information is added before the formation of image so that the authenticity of the digital images is guaranteed from the very beginning.

3. The Present invention divides the information of each pixel point in the digital signals into three parts on the basis of bit, some bits are used to generate the unique eigenvalue of the digital signals, some bits are used to hide the watermark information and some bits are used to locate the altered regions of the images. Thus, the matter that the embedded watermarks change the digital signals and thereby change the calculated eigenvalue is solved.

When the image is altered, the calculated eigenvalue or the hidden watermark information or the located altered region of the digital signals reverted from the image is changed. The calculated eigenvalue and the extracted watermark information obtained are compared and if they are equal and no altered region is located, the picture is deemed valid without tampering. Otherwise the picture is deemed altered. In the latter case, the altered regions can be pointed out.

4. The present invention embeds data information in the most visual-insensitive regions of the image according to the visual characteristics of men so as to guarantee the least visual differences between the image before embedding watermark and that after embedding watermark.

5. The public key algorithm is used to increase the algorithmic security. Even if the algorithm of the watermark is disclosed, other people are still unable to simulate the embedding of watermark because they don't have the secret key for embedding watermark, whereas the public key makes the identifying of the authenticity and integrity of the picture can be completed by anyone, which makes the present invention more practical.

6. It is known that the speed of the microprocessor of digital cameras is slow when compared with the processing speed of the CPU of PCs. The present invention doesn't use the method of processing the image by different blocks and therefore greatly increases the processing speed of the image, which makes it applicable in digital cameras.

DETAILED DESCRIPTION OF PREFERRED EMBODIMENTS

Figure 1:
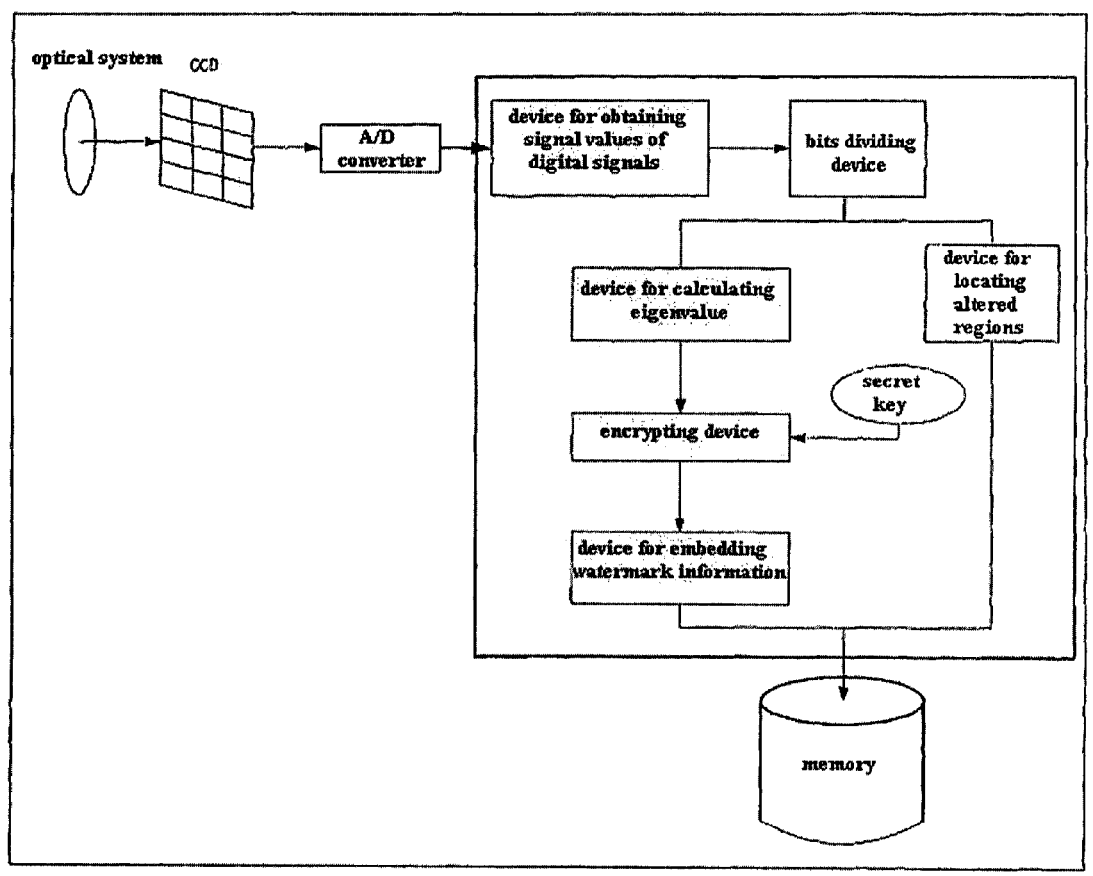
FIG. 1 is the set-up diagram of devices in the digital camera of the present invention.
Figure 2:
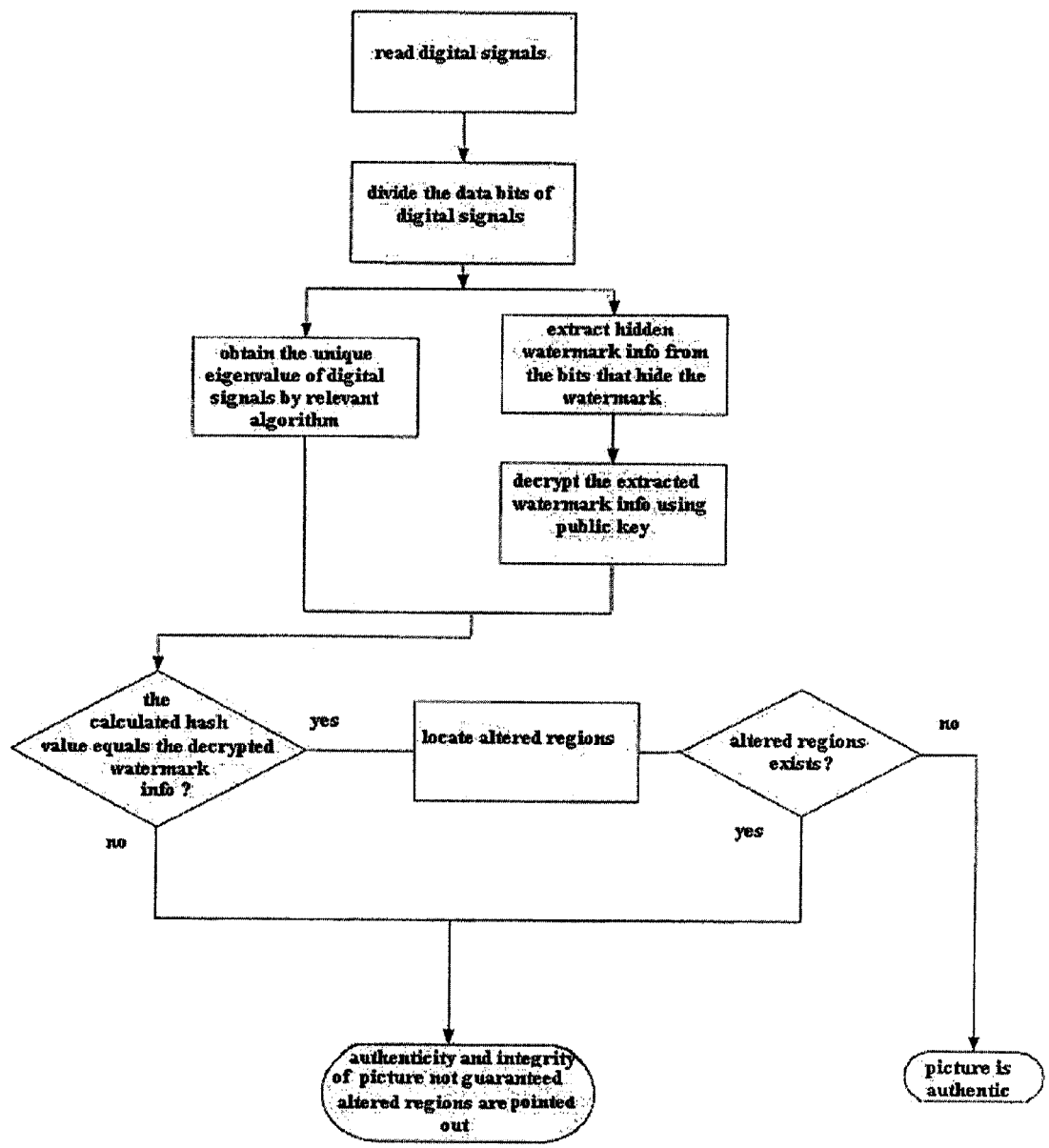
FIG. 2 is the flow chart of the method for identifying pictures of the present invention.

The present invention is further described below with references to the drawings. The devices in the digital camera in FIG. 1 can be divided into six parts. The identification process of pictures in FIG. 2 can be divided into 7 steps.

The digital camera including a watermark-adding device comprises:
- a device for obtaining the signal value of the digital signals, which is designed to read the value of the digital signals that is obtained by converting the analog signals responding to the optical image;
- a bits dividing device, which is designed to divide the data recording each pixel point of the digital image into bits for calculating eigenvalue of the image, bits for hiding the watermark and the bits for locating altered regions;
- a device that initializes the locating of altered regions, which sets all the date of the bits for locating altered regions to a fixed value such as 0 or 1 so as to locate the altered regions of the image when identifying;
- a device for calculating the eigenvalue, which is designed to calculate the unique eigenvalue of input digital signals using the bits for calculating the eigenvalue of the digital image;
- an encrypting device, which encrypts the calculated eigenvalue using secret key; and
- a watermark embedding device, which embeds the encrypted eigenvalue in the bits for hiding the watermark by fragile digital watermarking techniques.

The identification process of pictures comprises the following steps:
- digital signals are reverted from lossless format picture and are then read;
- the data recording each pixel point of the digital image are marked on the basis of bit as bits for calculating the eigenvalue of the image, bits for hiding the watermark and bits for locating the altered regions;
- relevant algorithm for calculating eigenvalue is used to obtain the unique eigenvalue of the digital signals from the bits for calculating the eigenvalue of the image.
- relevant fragile watermarking technique is used to extract hidden watermark information from the bits for hiding the watermark;
- the extracted watermark information is decrypted by public key;
- the altered regions of the picture are located and the position where the values of the corresponding bits for locating the altered regions are differ from the original is recorded so as to obtain the altered regions of the image; and
- the hash value and the decrypted watermark information obtained are compared and if they are equal and no altered region is located, the picture is deemed authentic without alteration. Otherwise the picture is deemed altered. In the latter case, the altered regions can be pointed out.

Please also refer to table 1 and table 2 about the system and the process.

It should be noted that the digital signals being processed in the embodiments are YUV data in the format of 8-4-4, which is a kind of color encoding method. YUV data in the format of 8-4-4 means that the YUV data are arranged in a specific mode. Of course the kind and the format of the data are not limited to this in practical applications. Generally, all kinds and formats of digital signals of the images are acceptable. For example, the RGB type image data may also be used and the least significant bit of B component can be used to locate the altered regions of the image, the least significant bit of G component can be used to hide the eigenvalue of the image and other data can be used to calculate the eigenvalue.

In addition, in the embodiments, the least significant bit of Y value is used to locate the altered regions, the less significant bit of Y value is embedded with encrypted eigenvalue and other data are all used to calculate the eigenvalue of the image. But the present invention is not limited by this in other practical applications. Theoretically, as long as the data for calculating eigenvalue, the data embedded with encrypted eigenvalue and the data for locating the altered regions cover all the data bits of all the pixels and the bits for locating the altered regions involve all the pixels, the method of utilizing the data is not important. Also, there must be enough space for hiding the encrypted eigenvalue.

For example, the least significant bit of Y value can be embedded with the encrypted eigenvalue, the less significant bit of Y value can be used to locate the altered regions of the image or several bits can be combined to hide the encrypted eigenvalue. Or, the least significant bit of the U value can be embedded with encrypted eigenvalue, the least significant bit of V value can be used to locate the altered regions of the image and other data can be used to calculate the eigenvalue. Or again, the least significant bit of a part of the Y value can be embed with encrypted eigenvalue, the least significant bit of the other part of the Y value can be used to locate altered regions of the image and other data can be used to calculate the eigenvalue.

Of course, only the data of a part of pixels can be used to hide the encrypted eigenvalue and to locate altered regions of the image. For example, the less significant bit of a part of the pixels can be embed with the encrypted eigenvalue, the least significant bit can be used to locate altered regions of the image and other bits of this part of the pixels can be used together with all the data of all the bits of the other part of pixels to calculate the eigenvalue.

There are many methods to divide the data, but special attention must be paid that the dividing method of the data should guarantee the quality of the image and should not result in appreciable changes. For that reason the data of the least and less significant bit of Y value are chosen to be modified and every effort is made not to make any relatively obvious change to the image quality.

The reason why each bit of each pixel is utilized is that in this case, any change of even one random pixel can be detected. However, if the user knows that more that one pixel is possibly changed or only wants to detect the change of one region, the rate of change of the pixel and the number of bits can be decreased correspondingly. In such cases, there is no need to arrange bits for locating altered regions for all pixels, nor need to cover each bit of all pixels by the combination of the three parts of bits.

TABLE 1

The watermark-adding system inside the digital camera

| | Device | Function |
|---|---|---|
| 1 | device for obtaining the signal value of digital signals | read the value of digital signals that is obtained by converting the analog signals responding to the optical image |
| 2 | bits dividing device | divide the data recording each pixel point of the digital image on the basis of bit into bits for calculating eigenvalue of the image, bits for hiding the watermark and the bits for locating altered regions |
| 3 | device that initializes the locating of altered regions | set all the data of the bits for locating altered regions to 0 or 1 |
| 4 | device for calculating the eigenvalue | calculate the unique eigenvalue of input digital signals using the bits for calculating the eigenvalue of the digital image |
| 5 | encrypting device | encrypt the calculated unique eigenvalue using secret key |
| 6 | watermark embedding device | embed the calculated eigenvalue in the bits for hiding the watermark by fragile digital watermarking techniques |

TABLE 2

Method/Steps for identifying digital pictures

| Step | Operation | Function |
|---|---|---|
| 1 | digital signals are reverted from lossless format picture | obtain digital signals |
| 2 | the data recording each pixel point of the digital image are marked on the basis of bit as bits for calculating the eignevalue of the image, bits for hiding the watermark and bits for locating the altered regions | identify bits with information of different properties |
| 3 | relevant algorithm for calculating eignevalue is used to obtain the unique eigenvalue of the digital signals from the bits for calculating the eignevalue of the image | calculate the unique eigenvalue of the digital signals |
| 4 | relevant fragile watermarking technique is used to extract hidden watermark information from bits for hiding the watermark | extract hidden watermark information |
| 5 | the extracted watermark information is decrypted by public key | obtain the decrypted watermark information |
| 6 | deteremine if there is any change to the data of the bits for locating altered regions | obtain altered regions of the image |
| 7 | the obtained eigenvalue and the watermark information are compared | obtain the result of identification: if they are equal and no altered region is located, the picture is deemed authentic without alteration; otherwise the picture is deemed altered; in the latter case, the altered regions can be pointed out. |

Figure 3:
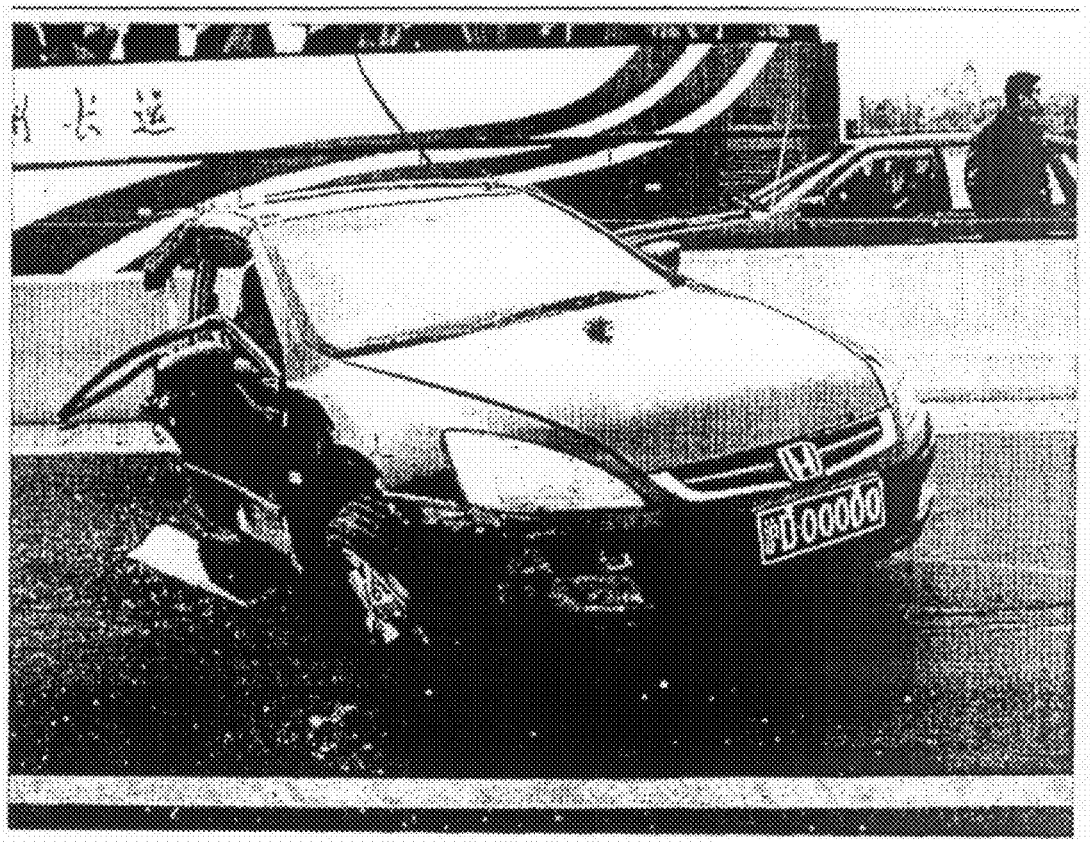
FIG. 3 is a picture taken by the digital camera comprising a watermark-adding device.

FIG. 3 is a picture taken by a digital camera comprising the device of the present invention, which shows a scene of a traffic accident and is used as an example. When taking pictures, optical images are converted to analog signals by CCD or CMOS and then the analog signals are converted into digital signals by A/D converter. In this embodiment, the digital signals received are YUV data stream in 8-4-4 format.

Then, the LSB (least significant bit) of each Y value in the YUV data stream are all set to 0 for locating altered regions of the image and the data of the less significant bits of the Y value in the YUV data stream are also set to 0. As mentioned already, it must be noted that the method for dividing the data is not limited here and instead of 0, the initial value may also be set to 1. After that, the 160 bit hash value of the YUV data stream is calculated by SHA-1 algorithm, which can be expressed in hexadecimal as "E6C2BD995EDCF316887EFD24EC5492ASC2991C53". Then the 160 bit hash value is encrypted using secret key and the encrypted hash value is embedded in the less significant bit of Y value sequentially and tautologically. If the bit of the hash value to be embedded is 1, the less significant bit of the Y value to be embedded is set to 1 and if the bit of the hash value to be embedded is 0, no action is taken and this process proceeds till the last Y value. In this way, the YUV data stream is processed by the watermark-adding device. In the end, the YUV data stream in 8-4-4 format is converted to 2-1-1 YUV data stream and then the data stream is saved as TIF type digital image.

Figure 4:
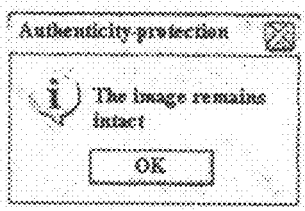
FIG. 4 is the identification result of FIG. 3.

FIG. 4 is the identification result of FIG. 3. When identifying, the 2-1-1 YUV data stream is read out from the digital picture in TIF format and is converted to 8-4-4 YUV data stream which is then copied to an array. After that, each LSB and less significant bit representing the data of Y value in this array are all set to 0 and the 160 bit hash value is obtained by using SHA-1 algorithm, which is expressed in hexadecimal as "E6C2BD995EDCF316887EFD24EC5492A8C2991C53". Then the value of the less significant bit of each Y value in the 8-4-4 YUV data stream is read and arranged in a sequence which is then decrypted using public key to obtain the decrypted hash value expressed in hexadecimal as "E6C2BD995EDCF316887EFD24EC5492A8C2991C53". After that, the value of the LSB of each Y value in the YUV data stream is observed and all these values are 0. Thus, it can be observed that the calculated 160 bit hash value of the YUV data stream is the same as the decrypted watermark information and the locating of the altered regions finds no modified region of the image, which shows that the picture is not altered and the dialog box returning the identification result prompts that "The image remains intact".

Figure 5:
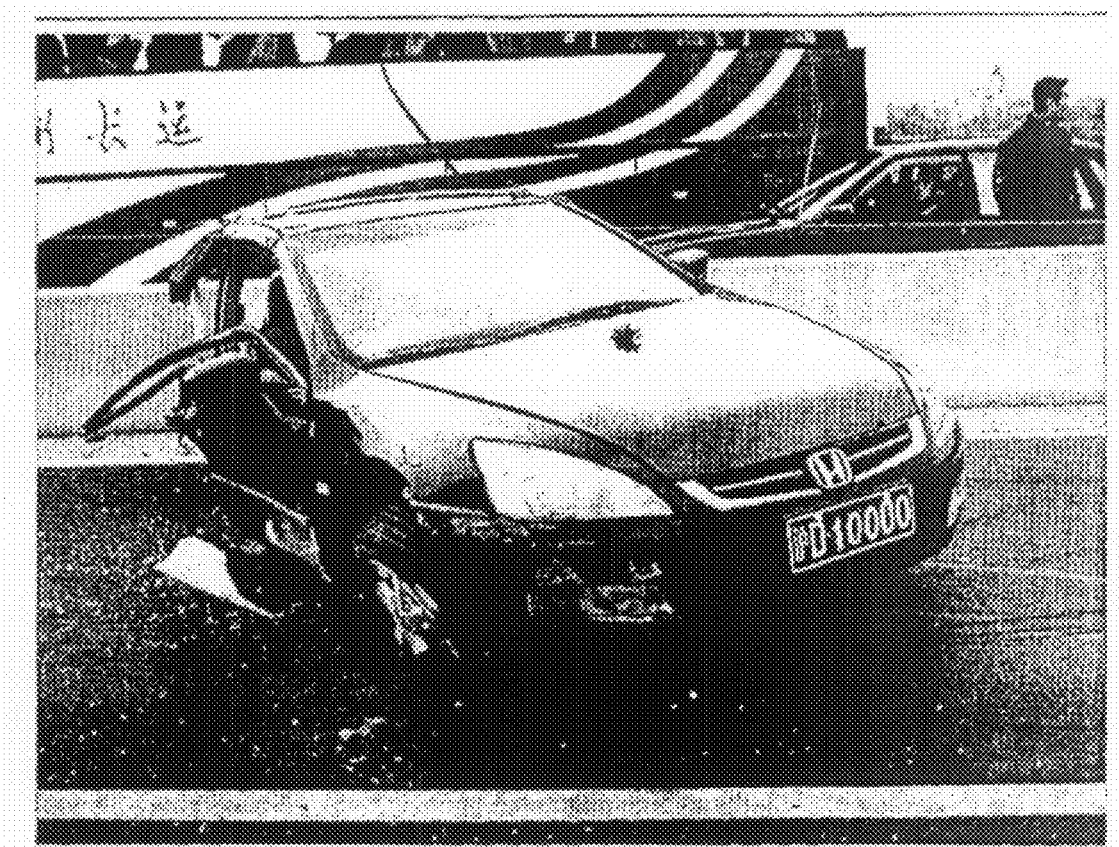
FIG. 5 is an altered picture of FIG. 3.

FIG. 5 is a altered picture of FIG. 3. In this example, the number plate of the picture shown in FIG. 3 has been changed from "D00000" into "D10000". This kind of modification to digital pictures is very easy, simple and straightforward. But in order to use pictures of documents or taken pictures as electronic evidences, the authenticity of the pictures must be known.

Figure 6:
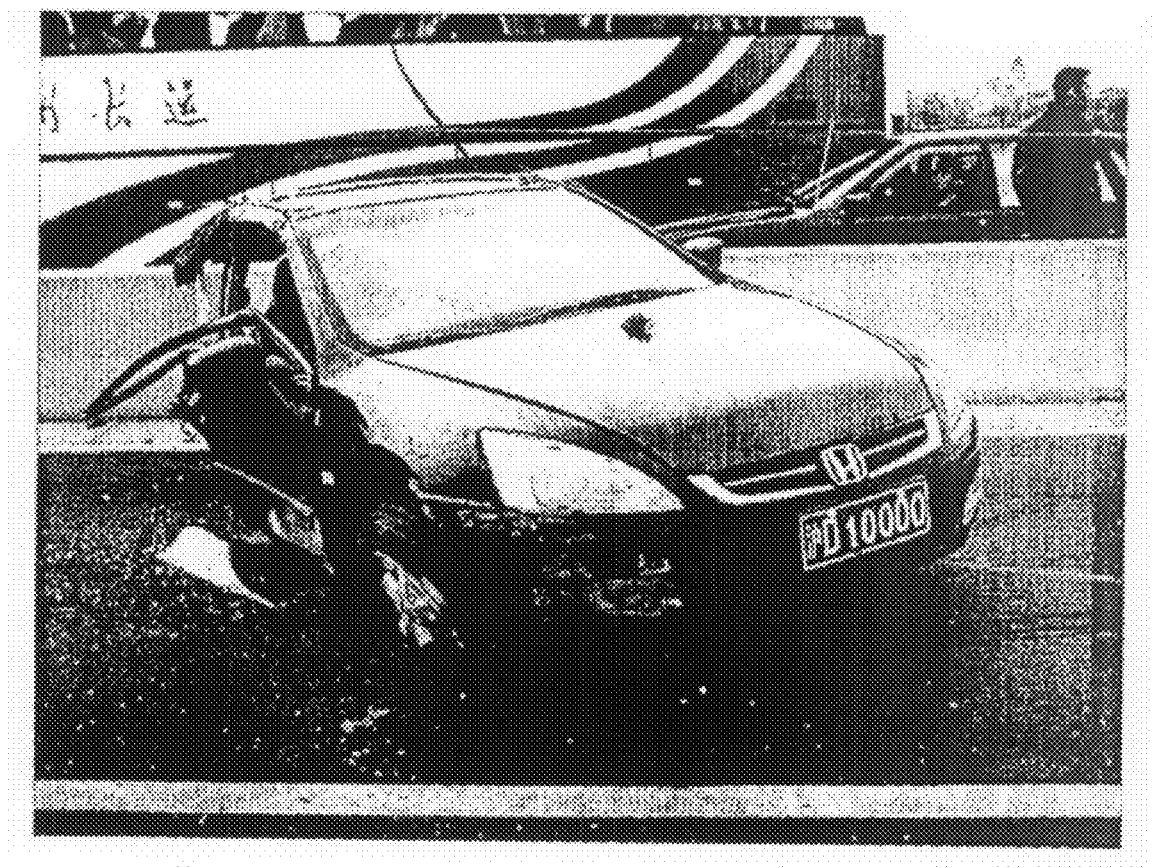
FIG. 6 is the identification result and the located altered region of FIG. 5.
Figure 6:
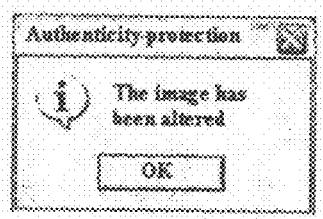

FIG. 6 is the identifying result of the altered digital picture shown in FIG. 5. When identifying, the 2-1-1 YUV data stream is read out from the digital picture in TIF format and is converted to 8-4-4 YUV data stream which is then copied to an array. After that, each LSB and less significant bit representing the data of y value in this array are all set to 0 and the 160 bit hash value is obtained by using SHA-1 algorithm, which is expressed in hexadecimal as "E5442CC3B4281EAAAAFBADOOBECAB7C957226E26". Then the value of the less significant bit of each Y value in the 8-4-4 YUV data stream is read and arranged in a sequence which is a random value. Thus, no decryption by public key is needed and it is known that the calculated 160 bit hash value of the YUV data stream cannot be the same. In this case, the authenticity and integrity of the picture are not guaranteed and the dialog box returning the identification result prompts that "The image has been altered!". At this time, because the data value has been changed, the altered region can be obtained by connecting the points where the values have been changed, which is shown in FIG. 6 by a black frame.

So Far, the method for adding watermark in digital image, the method of identification, the device thereof and the digital camera comprising the watermark-adding device have been described in the present invention. As far as the persons skilled in this field are concerned, any alteration or change to the invention under the concept of the invention described above is acceptable and is in the scope of protection of the present invention.

We claim:

1. A method for embedding a watermark in a digital image, said method comprising the steps of:
    obtaining data representing each pixel of a digital image;
    dividing data bits of the data of each pixel of the digital image into bits for calculating an eigenvalue of the digital image, bits for hiding a watermark and bits for locating altered regions in the digital image;
    calculating the eigenvalue of the digital image, wherein the calculated eigenvalue is a unique eigenvalue of the digital image calculated by an algorithm that calculates an eigenvalue;
    setting all of the bits for locating altered regions to 0 or to 1;
    encrypting the calculated eigenvalue; and
    hiding the encrypted eigenvalue in the digital image using a fragile watermarking technique.

2. A device for embedding a watermark in a digital image, said device comprising:
    a data obtaining device;
    a bits dividing device;
    an eigenvalue generating device;
    an altered regions initializing device;
    an encrypting device; and
    a hiding device; wherein
    said data obtaining device is used to obtain the data representing each pixel of the digital image;
    said bits dividing device is used to divide data bits of the data of each pixel of the digital image into bits for calculating an eigenvalue of the digital image, bits for hiding a watermark and bits for locating altered regions in the digital image;
    said eigenvalue generating device is used to calculate the eigenvalue of the digital image;
    said altered regions initializing device is used to set values for locating altered regions;
    said encrypting device is used to encrypt the calculated eigenvalue; and
    said hiding device hides the encrypted eigenvalue in the digital image using a fragile watermarking technique.

3. A device for identifying the authenticity and integrity of a digital image, said device comprising:
    a bits dividing device;
    an eigenvalue generating device;
    an watermark extracting device;
    an decrypting device;
    an altered regions locating device; and
    a comparing device;
    wherein said bits dividing device is used to divide data bits of data of each pixel of the digital image into bits for calculating an eigenvalue of the digital image, bits for hiding a watermark and bits for locating altered regions in the digital image;
    said eigenvalue generating device is used to calculate the eigenvalue of the digital image;
    said watermark extracting device is used to extract hidden watermark information from the digital image;
    said decrypting device is used to decrypt the extracted information;
    said altered regions locating device is used to locate the altered regions;
    said comparing device compares the calculated eigenvalue and the decrypted information, and based on a result of the comparison, it is determined that the digital image is authentic without alteration, or that the authenticity and integrity of the digital image are not guaranteed and altered regions are located.

4. A digital camera comprising a watermark-adding device, which comprises:
    a device for obtaining the digital signals representing each pixel of a digital image;
    a bits dividing device;
    an altered regions initializing device;
    an eigenvalue calculating device;
    an encrypting device; and
    a watermark embedding device;
    wherein
    said bits dividing device is used to divide data bits corresponding to each pixel of the digital image into bits for calculating an eigenvalue of the digital image, bits for hiding a watermark and bits for locating altered regions in the digital image;
    said altered regions initializing device is used to set values for locating altered regions;
    said eigenvalue calculating device is used to calculate a unique eigenvalue of the digital signals;
    said watermark embedding device is used to embed fragile watermark information in the digital signals according to the calculated eigenvalue.

5. The digital camera as claimed in claim 4, wherein said digital signals obtained by the device for obtaining the signal values of digital signals are digital signals that are converted from analog signals in the digital camera responding to optical images.

6. The digital camera as claimed in claim 4, wherein said watermark embedding device embeds the encrypted eigenvalue in digital signals using a fragile watermarking technique.

7. The digital camera of claim 4, wherein the device that initializes the locating of altered regions sets the bits for locating altered regions to a fixed value of zero or one to locate the altered regions of the digital image;
    the device for calculating the eigenvalue calculates the unique eigenvalue of input digital signals using the bits for calculating the eigenvalue of the digital image;
    the encrypting device encrypts the calculated eigenvalue using a secret key; and
    the watermark embedding device embeds the encrypted eigenvalue in the bits for hiding the watermark by a fragile digital watermarking technique.

8. The digital camera of claim 4, wherein the camera performs an image identification process comprising:
    reading reverted digital signals from a lossless format of the digital image;
    dividing data bits corresponding to each pixel of the digital image into bits for calculating an eigenvalue of the digital image, bits for hiding a watermark and bits for locating altered regions in the digital image;
    calculating the eigenvalue of the digital image, wherein the calculated eigenvalue is a unique eigenvalue of the digital image calculated by an algorithm that calculates an eigenvalue;

using a relevant fragile watermarking technique to extract hidden watermark information from the bits for hiding the watermark;

decrypting the extracted watermark information by a public key;

locating altered regions of the digital image based on positions where values of the corresponding bits for locating the altered regions differ from a previously set value; and comparing a Hash value and the decrypted watermark information;

in response to the comparison, determining whether the digital image is authentic without alteration, or whether the digital image is altered; and if the digital image is altered, pointing out the altered regions.

9. The digital camera of claim 8, wherein said data of each pixel of the digital image are YUV data in the format of 8-4-4.

10. The digital camera of claim 9, wherein the least significant bit of the Y value is used to locate the altered regions, the less significant bit of the Y value is embedded with encrypted eigenvalue, and other bits are used to calculate the eigenvalue of the digital image.

11. The digital camera of claim 9, wherein the least significant bit of the Y value is embedded with the encrypted eigenvalue, the less significant bit of the Y value is used to locate the altered regions of the digital image, or several bits are combined to hide the encrypted eigenvalue.

12. The digital camera of claim 9, wherein the least significant bit of the U value is embedded with encrypted eigenvalue, the least significant bit of the V value is used to locate the altered regions of the digital image, and other bits are used to calculate the eigenvalue.

13. The digital camera of claim 9, wherein the least significant bit of a part of the Y value is embedded with encrypted eigenvalue, the least significant bit of the other part of the Y value is used to locate altered regions of the digital image, and other data bits are used to calculate the eigenvalue.

14. The digital camera of claim 9, wherein the data of a part of the pixels are used to hide the encrypted eigenvalue and to locate altered regions of the digital image.

15. The digital camera as claimed in claim 14, wherein the less significant bit of a part of the pixels is embedded with the encrypted eigenvalue, the least significant bit is used to locate altered regions of the digital image, and other bits of the part of the pixels are used with all the data of all the bits of the other part of the pixels to calculate the eigenvalue.

16. The digital camera of claim 9, wherein said data of each pixel of the digital image are RGB type data.

17. The digital camera as claimed in claim 16, wherein the least significant bit of the B value is used to locate the altered regions of the digital image, the least significant bit of the G value is used to hide the eigenvalue of the digital image, and other data bits are used to calculate the eigenvalue.

* * * * *